No. 619,055. Patented Feb. 7, 1899.
W. TAYLOR.
SEED DISTRIBUTER.
(Application filed July 6, 1898.)
(No Model.)
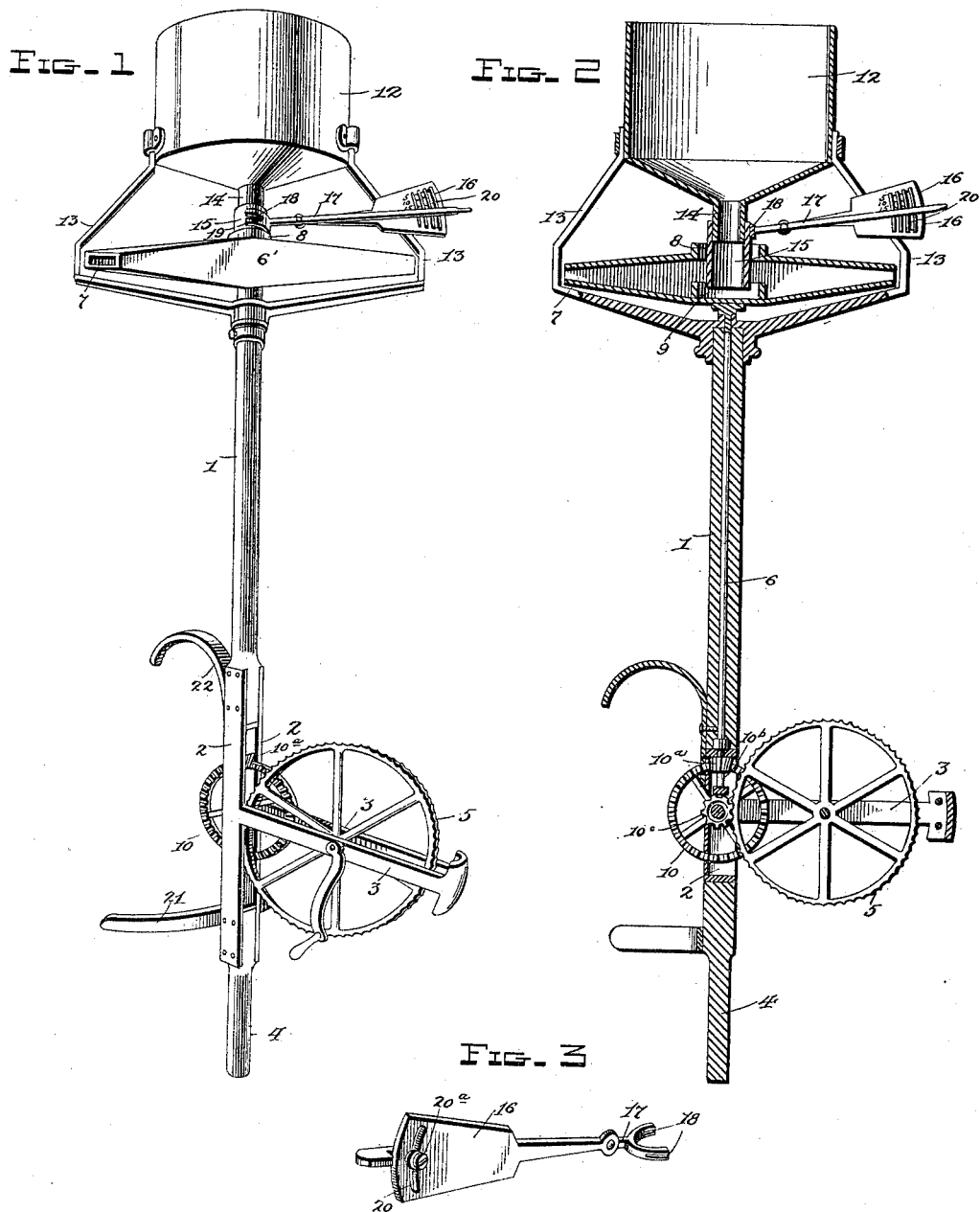

UNITED STATES PATENT OFFICE.

WILLIAM TAYLOR, OF OBION, TENNESSEE.

SEED-DISTRIBUTER.

SPECIFICATION forming part of Letters Patent No. 619,055, dated February 7, 1899.

Application filed July 6, 1898. Serial No. 685,248. (No model.)

*To all whom it may concern:*

Be it known that I, WILLIAM TAYLOR, a citizen of the United States, residing at Obion, in the county of Obion and State of Tennessee, have invented certain new and useful Improvements in Seed-Distributers; and I do declare the following to be a full, clear, and exact description of the invention, such as will enable others skilled in the art to which it appertains to make and use the same.

My invention has relation to seed-distributers; and the object sought is to improve the construction shown in my Patent No. 588,367, dated August 17, 1897, and to provide means whereby the distribution of seed may be regulated and the amount sown to a given quantity of ground indicated.

With these objects in view the invention consists in certain features of construction and combination of parts, which will be hereinafter fully described and claimed.

In the drawings, Figure 1 is a perspective view of my improved seed-distributer, and Fig. 2 is a longitudinal sectional view of the same. Fig. 3 is a detail perspective view of the seed-regulating means.

In said drawings, 1 denotes the frame or support, which is tubular in form; 2, bracket-plates bolted to its lower end, from which project lateral arms 3; 4, the handle, and 5 a drive-wheel journaled between the bracket-arms.

6 denotes a shaft which extends vertically through the support and has fixed to its upper end a distributer 6', which has a contracted outlet 7, an inlet 8, and a pan 9, into which the seed is deposited. The lower end of the shaft is provided with a pinion $10^a$, which meshes with a bevel gear-wheel 10, fixed to the transverse shaft $10^b$, journaled in the bracket-plates 2 2. A pinion $10^c$ is also fixed to said shaft and is driven by the drive-wheel 5.

12 denotes a hopper connected by bracket-arms 13 to the upper end of the frame or support. The bottom of the hopper is preferably conical and is provided with a discharge-spout 14, that projects downwardly over the pan and over which freely slides a regulating-sleeve 15.

One of the bracket-supporting arms is provided with a laterally-projecting plate having vertical rows of numerals to form scales 16. Pivoted to the extension of the plate is a lever 17, having its inner end forked and provided with notches 18, that engage laterally-projecting studs 19 on the regulating-sleeve.

20 denotes a curved slot in the laterally-projected plate, through which and the outer end of the lever 17 a set-screw $20^a$ extends to lock the lever in adjusted position to the plate.

21 denotes a curved support which is adapted to bear against the operator at about his waist-line, and 22 represents a hook-shaped bar which is adapted to lie over the operator's shoulder. This bar may be made adjustable, so as to accommodate persons of different build.

When it is desired to sow a certain amount of seed to an acre, the set-screw is loosened and the lever raised or lowered, as the case may be, until its outer end registers with one of the numerals of the scale, this numeral representing the number of bushels to be sown. The set-screw is now tightened. By the movement of the lever the regulating-sleeve will be raised or lowered to increase or diminish the flow of seed from the spout of the hopper into the pan of the distributer.

The operation of the other parts of my machine being substantially the same as set forth in the patent above referred to, a detailed description is not thought to be necessary.

Having thus described my invention, what I claim as new is—

In a seed-distributer, the combination with a tubular support, of a shaft journaled therein and having at one end a pinion and at its upper end a distributer having an inlet in its top, and having contracted outlets, a pan secured in said distributer, a feed-hopper having a discharge-spout projecting through said distributer, bracket-arms connecting the feed-hopper with the tubular support, a plate secured to one of the bracket-arms and provided with a scale, a regulating-sleeve having a sliding engagement with the spout of the feed-hopper, a lever pivoted to said indicating-plate and having a fork at one end provided with notches that engage laterally-projecting studs on the sleeve, a set-screw adapted to hold the lever in its adjusted position, brackets secured to the lower end of the tubular support, a drive-wheel journaled in said brackets, intermediate mechanism connecting the drive-wheel with the pinion, a crank for turning the drive-wheel, and means for attaching the device to an operator, substantially as set forth.

In testimony whereof I have hereunto set my hand in presence of two subscribing witnesses.

WILLIAM TAYLOR.

Witnesses:
J. T. MORRIS,
C. C. BROWN.